(12) United States Patent
Wei et al.

(10) Patent No.: US 6,753,791 B2
(45) Date of Patent: *Jun. 22, 2004

(54) BURST QAM DOWNHOLE TELEMETRY SYSTEM

(75) Inventors: Michael Wei, Plano, TX (US); William Trainor, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 299 days.

This patent is subject to a terminal disclaimer.

(21) Appl. No.: 10/017,176

(22) Filed: Dec. 7, 2001

(65) Prior Publication Data

US 2002/0113718 A1 Aug. 22, 2002

Related U.S. Application Data

(63) Continuation-in-part of application No. 09/599,343, filed on Jun. 22, 2000, now Pat. No. 6,348,876.

(51) Int. Cl.[7] .................................................. H04L 5/12
(52) U.S. Cl. ............................. 340/854.9; 340/854.4; 325/298; 325/261
(58) Field of Search ......................... 340/854.9, 854.4; 375/298, 261; 138/125, 118.1; 166/250.15, 373; 370/912

(56) References Cited

U.S. PATENT DOCUMENTS

| | | |
|---|---|---|
| 4,464,767 A | 8/1984 | Bremer |
| 4,534,040 A | 8/1985 | Thapar |
| 5,321,819 A | 6/1994 | Szczepanek |
| 5,342,408 A | 8/1994 | deCoriolis et al. |
| 5,387,907 A | 2/1995 | Gardner et al. |
| 5,490,121 A | 2/1996 | Gardner et al. |
| 5,504,479 A | 4/1996 | Doyle et al. |
| 5,554,804 A | 9/1996 | Delatorre et al. |
| 5,838,727 A | 11/1998 | Lyon et al. ............ 375/261 |
| 6,046,674 A | 4/2000 | Irwin et al. |
| 6,175,599 B1 | 1/2001 | Lyon et al. |
| 6,192,980 B1 | 2/2001 | Tubel et al. |
| 6,289,238 B1 | 9/2001 | Besson et al. |
| 6,347,096 B1 | 2/2002 | Profumo et al. |
| 6,348,876 B1 | 2/2002 | Wei et al. ............ 340/854.9 |

*Primary Examiner*—Albert K. Wong
(74) *Attorney, Agent, or Firm*—Conley Rose, P.C.

(57) ABSTRACT

A downhole telemetry system that transmits a burst-QAM uplink signal to the surface of the well is disclosed. In a preferred embodiment, a downhole instrument coupled to a pair of conductors in a wireline or composite tubing string transmits a burst-QAM uplink signal to a surface system. The burst-QAM signal preferably comprises a series of data frames carrying telemetry data. Each data frame is preferably preceded by a quiet interval (when no signal is present), a timing synchronization sequence, and a training sequence. The timing synchronization sequence is designed for easy timing recovery at the surface, and the training sequence is designed to aid the adaptation of the equalizer. The data frame itself preferably includes a synchronization field, a data count, and a checksum in addition to the data. Direct digital synthesis is preferably employed to modulate the uplink signal.

19 Claims, 5 Drawing Sheets

BURST QAM DOWNHOLE TELEMETRY SYSTEM

CROSS-REFERENCE TO RELATED APPLICATIONS

The present application is a continuation-in-part of U.S. patent application Ser. No. 09/599,343, filed Jun. 22, 2000, now U.S. Pat. No. 6,348,876 and entitled "Burst QAM Downhole Telemetry System" by inventors Michael Wei and William Trainor.

BACKGROUND OF THE INVENTION

1. Field of the Invention

The present invention relates to a telemetry system for transmitting data from a downhole drilling assembly to the surface of a well. More particularly, the present invention relates to a system and method for signaling over information conduits coupled between a downhole transmitter and an uphole receiver.

2. Description of the Related Art

Modern petroleum drilling and production operations demand a great quantity of information relating to parameters and conditions downhole. Such information typically includes characteristics of the earth formations traversed by the wellbore, along with data relating to the size and configuration of the borehole itself. The collection of information relating to conditions downhole, which commonly is referred to as "logging", can be performed by several methods.

In conventional oil well wireline logging, a probe or "sonde" housing formation sensors is lowered into the borehole after some or all of the well has been drilled, and is used to determine certain characteristics of the formations traversed by the borehole. The upper end of the sonde is attached to a conductive wireline that suspends the sonde in the borehole. Power is transmitted to the sensors and instrumentation in the sonde through the conductive wireline. Similarly, the instrumentation in the sonde communicates information to the surface by electrical signals transmitted through the wireline.

The problem with obtaining downhole measurements via wireline is that the drilling assembly must be removed or "tripped" from the drilled borehole before the desired borehole information can be obtained. This can be both time-consuming and extremely costly, especially in situations where a substantial portion of the well has been drilled. In this situation, thousands of feet of tubing may need to be removed and stacked on the platform (if offshore). Typically, drilling rigs are rented by the day at a substantial cost. Consequently, the cost of drilling a well is directly proportional to the time required to complete the drilling process. Removing thousands of feet of tubing to insert a wireline logging tool can be an expensive proposition.

As a result, there has been an increased emphasis on the collection of data during the drilling process. Collecting and processing data during the drilling process eliminates the necessity of removing or tripping the drilling assembly to insert a wireline logging tool. It consequently allows the driller to make accurate modifications or corrections as needed to optimize performance while minimizing down time. Designs for measuring conditions downhole including the movement and location of the drilling assembly contemporaneously with the drilling of the well have come to be known as "measurement-while-drilling" techniques, or "MWD". Similar techniques, concentrating more on the measurement of formation parameters, commonly have been referred to as "logging while drilling" techniques, or "LWD". While distinctions between MWD and LWD may exist, the terms MWD and LWD often are used interchangeably. For the purposes of this disclosure, the term MWD will be used with the understanding that this term encompasses both the collection of formation parameters and the collection of information relating to the movement and position of the drilling assembly.

When oil wells or other boreholes are being drilled, it is frequently necessary or desirable to determine the direction and inclination of the drill bit and downhole motor so that the assembly can be steered in the correct direction. Additionally, information may be required concerning the nature of the strata being drilled, such as the formation's resistivity, porosity, density and its measure of gamma radiation. It is also frequently desirable to know other downhole parameters, such as the temperature and the pressure at the base of the borehole, for example. Once this data is gathered at the bottom of the borehole, it is typically transmitted to the surface for use and analysis by the driller.

Sensors or transducers typically are located at the lower end of the drill string in LWD systems. While drilling is in progress these sensors continuously or intermittently monitor predetermined drilling parameters and formation data and transmit the information to a surface detector by some form of telemetry. Typically, the downhole sensors employed in MWD applications are positioned in a cylindrical drill collar that is positioned close to the drill bit. The MWD system then employs a system of telemetry in which the data acquired by the sensors is transmitted to a receiver located on the surface. There are a number of telemetry systems in the prior art which seek to transmit information regarding downhole parameters up to the surface without requiring the use of a wireline cable. Of these, the mud pulse system is one of the most widely used telemetry systems for MWD applications.

The mud pulse system of telemetry creates "acoustic" pressure signals in the drilling fluid that is circulated under pressure through the drill string during drilling operations. The information that is acquired by the downhole sensors is transmitted by suitably timing the formation of pressure pulses in the mud stream. The information is received and decoded by a pressure transducer and computer at the surface.

In a mud pressure pulse system, the drilling mud pressure in the drill string is modulated by means of a valve and control mechanism, generally termed a pulser or mud pulser. The pulser is usually mounted in a specially adapted drill collar positioned above the drill bit. The generated pressure pulse travels up the mud column inside the drill string at the velocity of sound in the mud. Depending on the type of drilling fluid used, the velocity may vary between approximately 3000 and 5000 feet per second. The rate of transmission of data, however, is relatively slow due to pulse spreading, distortion, attenuation, modulation rate limitations, and other disruptive forces, such as the ambient noise in the drill string. A typical pulse rate is on the order of a pulse per second (1 Hz).

Given the recent developments in sensing and steering technologies available to the driller, the amount of data that can be conveyed to the surface in a timely manner at 1 bit per second is sorely inadequate. As one method for increasing the rate of transmission of data, it has been proposed to transmit the data using vibrations in the tubing wall of the drill string rather than depending on pressure pulses in the drilling fluid. However, the presence of existing vibrations in the drill string due to the drilling process severely hinders the detection of signals transmitted in this manner.

SUMMARY OF THE INVENTION

Accordingly, there is disclosed herein a downhole telemetry system that transmits a burst-QAM uplink signal to the surface of the well. In a preferred embodiment, a downhole instrument coupled to a pair of conductors transmits a burst-QAM uplink signal to a surface system similarly coupled to the pair of conductors. The burst-QAM signal preferably comprises a series of data frames carrying telemetry data. Each data frame is preferably preceded by a quiet interval (when no signal is present), a timing synchronization sequence, and a training sequence. The timing synchronization sequence is designed for easy timing recovery at the surface, and the training sequence is designed to aid the adaptation of the equalizer. The data frame itself preferably includes a synchronization field, a data count, and a checksum in addition to the data. Direct digital synthesis is preferably employed to modulate the uplink signal.

BRIEF DESCRIPTION OF THE DRAWINGS

A better understanding of the present invention can be obtained when the following detailed description of the preferred embodiment is considered in conjunction with the following drawings, in which.

Figure 1:
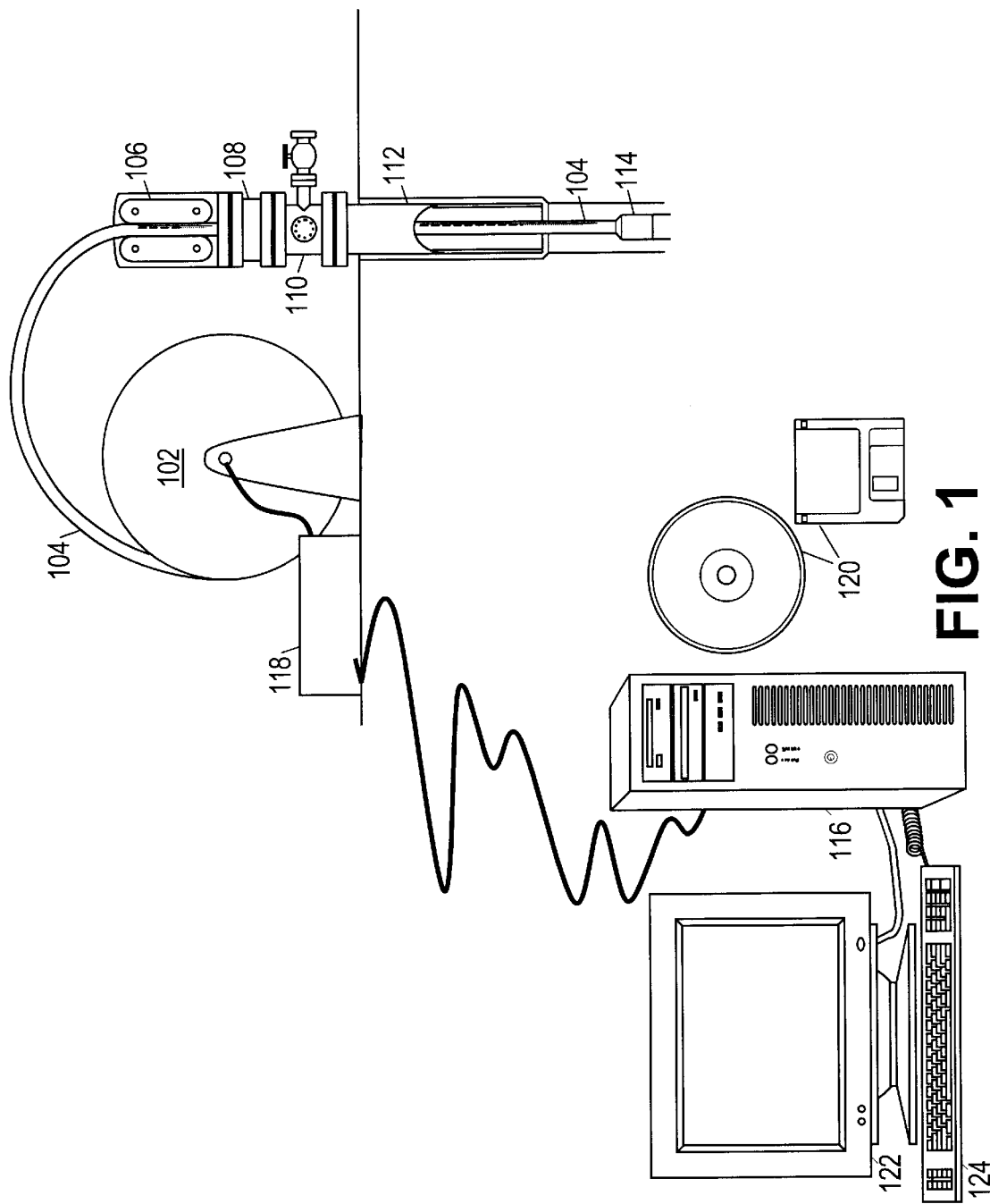
FIG. 1 is a schematic view of an oil well in which the telemetry system may be employed.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Figure 9:
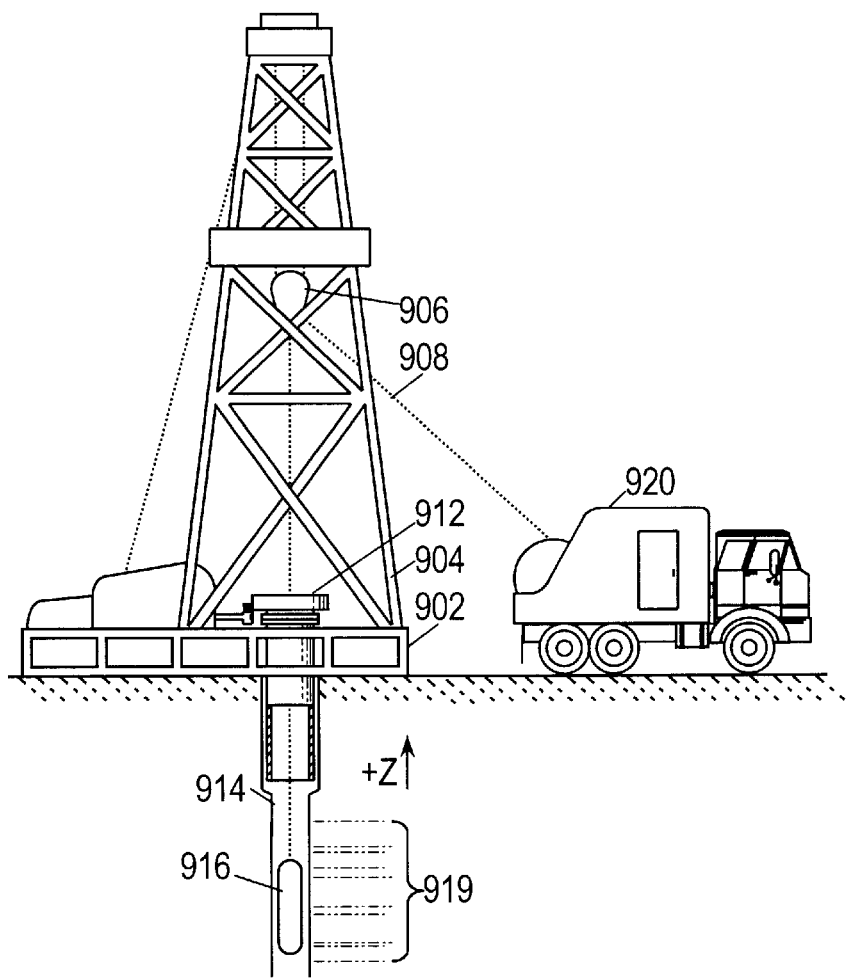
FIG. 9 is a schematic view of a wireline system in which the telemetry system may be employed.

Turning now to the figures, FIG. 9 shows a well during wireline logging operations. A drilling platform 902 is equipped with a derrick 904 that supports a hoist 906. Drilling of oil and gas wells is commonly carried out by a string of drill pipes connected together by "tool" joints so as to form a drilling string that is lowered through a rotary table 912 into a wellbore 914. In FIG. 9, the drilling string has been temporarily removed from the wellbore 914 to allow a sonde 916 to be lowered by wireline 908 into the wellbore 914. Typically, the sonde 916 is lowered to the bottom of the region of interest and subsequently pulled upward at a constant speed. During the upward trip, the sonde 916 performs measurements on the formations 919 adjacent to the wellbore as they pass by. The measurement data is communicated to a logging facility 920 for storage, processing, and analysis. In an alternative situation (e.g. a highly deviated or horizontal well), a threaded or continuous tubing string may be employed to convey the sonde through the hole. In this circumstance the wireline may be run through the interior of the tubing string or attached to the exterior of the tubing string.

Figure 10:
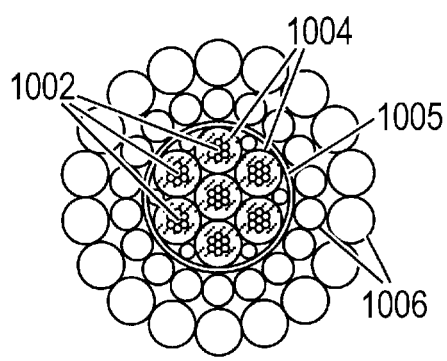
FIG. 10 shows a cross-section of a seven-conductor wireline cable.
Figure 11:
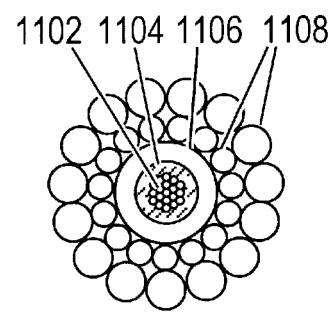
FIG. 11 shows a cross-section of a single-conductor wireline cable.

FIG. 10 shows a cross-section of a typical wireline cable having multiple conductors 1002. Each of the conductors is surrounded by an insulating jacket 1004. The insulated conductors may be bundled together in a poorly-conductive wrap 1005, which is surrounded by two layers of counter-wound metal armor wire 1006. Being made of metal, the armor wires are conductive and may be used as an eighth conductor. In wireline logging of cased and cemented wells, a single conductor logging cable such as that shown in FIG. 11 may be preferred. The single conductor cable typically has a single, multi-stranded conductor 1102 encased in insulative material 1104 and wound within a fabric liner 1106 which is in turn wound within a double layer of counter wound metal armor wires 1108. Power and telemetry are typically conveyed together on a single cable. In single conductor cables, the power is generally transmitted as a low frequency signal, whereas the telemetry signal(s) are transmitted in a higher frequency band. In multi-conductor cables, the signal isolation is further improved by the use of orthogonal transmission modes. Orthogonal modes and the circuitry therefor are discussed in much greater detail in co-pending application Ser. No. 09/437,594, entitled "High-Power Well Logging Method And Apparatus" by inventors G. Baird, C. Dodge, T. Henderson and F. Velasquez, which is hereby incorporated herein by reference.

Accordingly, there are at least two methods for establishing a communications channel for downhole communications. One of several orthogonal transmission modes may be used to carry the telemetry signal on a multiconductor cable, or a single conductor cable may be used to carry the telemetry signal in the normal fashion. FIG. 1 shows a third method that employs conductors embedded in the walls of composite tubing.

FIG. 1 shows a well having a spool 102 of composite or steel tubing 104 being injected into a wellbore by an injector 106. The tubing 104 is injected through a packer 108 and a blowout preventer 110, and passes through casing 112 into the wellbore. In the well, a downhole instrument 114 may be coupled to the composite tubing 104 and configured to communicate to a surface computer system 116 via information conduits embedded contained in the composite tubing 104. Alternatively for steel tubing 104, the downhole instrument may be configured to communicate to the surface computer system 116 via a wireline cable contained in the interior of the tubing 104. A power supply 118 may be provided to supply power to downhole instrument 114 via power conduits in composite tubing 104 or wireline cable.

Surface computer system 116 is configured to communicate with downhole instrument 114. Downhole instrument 114 may, for example, be a supervisory sub for a bottom-hole drilling assembly. The sub may be coupled to downhole sensors and/or control devices configurable to measure and set, respectively, downhole parameters. Examples of sensors include temperature, pressure, density, and flow-rate sensors. Examples of control devices include valves, variable-aperture ports, heaters, and artificial lift devices.

Surface computer system 116 is preferably configured by software 120 to monitor and control downhole instrument 114. System 116 may include a display device 122 and a user-input device 124 to allow a human operator to interact with the system control software 120.

Figure 2B:
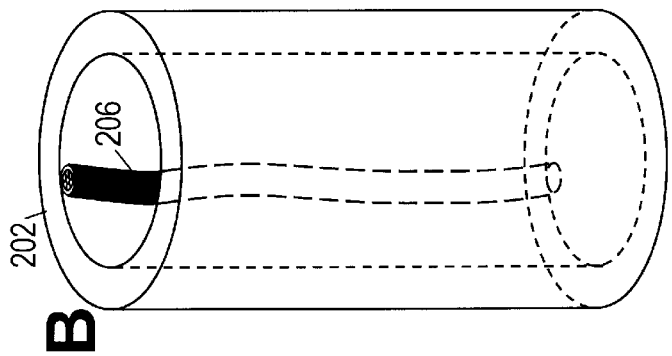
FIG. 2B is an isometric view of a tubing section having a wireline cable contained within.
Figure 2A:
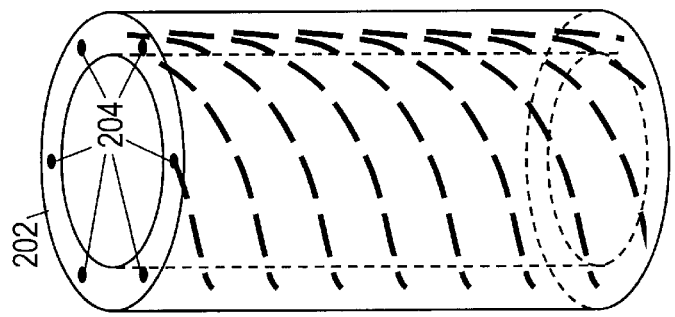
FIG. 2A is an isometric schematic of a composite tubing section having helically wound information conduits contained within.

An isometric representation of composite tubing 104 is shown in FIG. 2A. As the name suggests, composite tubing 104 is a tube having walls 202 made primarily of a composite material such as, e.g. fiberglass or carbon fiber, although other suitable materials are known and contemplated. Conduits 204 may be embedded in the walls of composite tubing. To reduce the probability of conduit breakage, the conduits are preferably wound helically around the tubing bore within the walls of the composite tubing. The winding angle is preferably a function of the stress coefficient differential between the conduit material and the composite material.

In a preferred embodiment, the conduits 204 contained in the composite tubing are electrical conductors, although one or more of the conduits may alternatively be optical fibers or hydraulic conduits. Preferably, six circumferentially-spaced conductors are provided, with two adjacent conductors dedicated to carrying telemetry signals. The electrical conductors for carrying telemetry in the wireline cable may similarly be replaced with telemetry conduits of different form, such as, for example, optical fibers or hydraulic conduits.

An isometric view of steel tubing 104 is shown in FIG. 2B. In this instance, a wireline cable is shown extending through the interior of the tubing. This reduces the possibility of conduit breakage from abrasion or "pinching" of the cable in the wellbore. The information conduits may be electrical or optical conductors.

Figure 3:
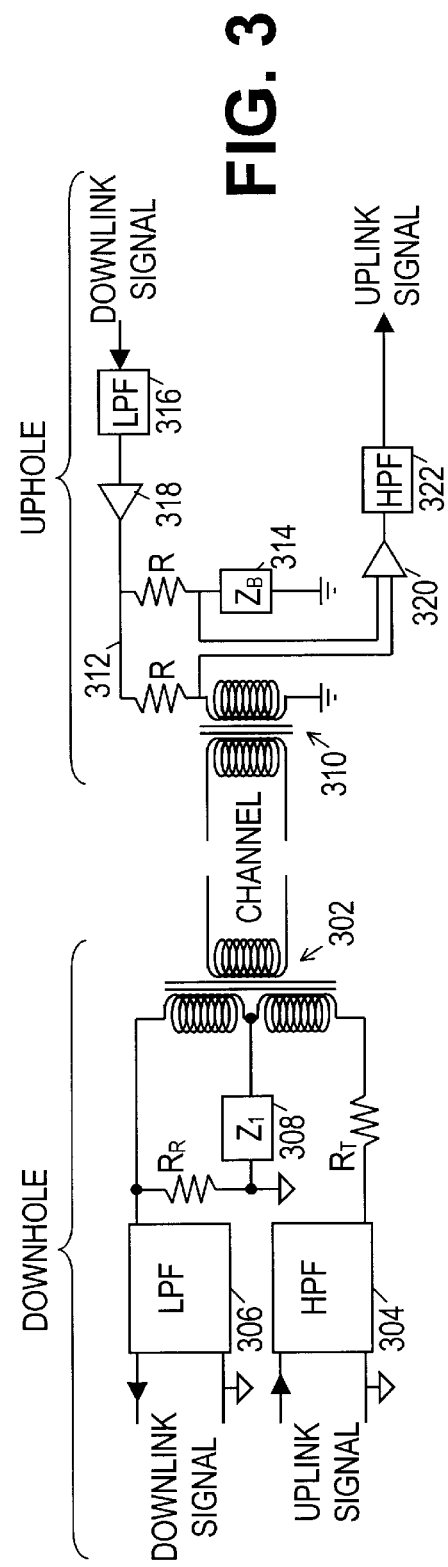
FIG. 3 is a schematic of the circuits that couple the telemetry signals to the tubing.

FIG. 3 shows one circuit configuration which allows the uplink telemetry signal to share electrical conductors with the downlink telemetry signal. In the downhole portion of the coupling circuit configuration, an isolation transformer 302 preferably couples the telemetry signal conductors of the wireline or tubing to the downhole instrument. A center-tapped secondary winding has one terminal end coupled to a high pass filter (HPF) 304 via a transmit resistance $R_T$, and the other terminal end coupled to a low pass filter (LPF) 306 with a shunt resistance $R_R$ to ground. The center tap is coupled to ground via an impedance block 308 for impedance matching purposes.

HPF 304 blocks signals below the uplink signal cutoff frequency, thereby preventing any uplink signal energy from interfering with the downlink signal. The uplink signal energy is screened off from the downlink signal by LPF 306, which blocks any signal energy above the cutoff frequency of the downlink signal.

It is noted that the energy of the uplink and downlink signals is expected to be comparable downhole. This is not the case at the surface, where the downlink signal energy is expected to be substantially greater than the uplink signal energy. To prevent the downlink signal from overwhelming the uplink signal detectors, a bridge arrangement is used in the uphole portion of the coupling circuit configuration.

The surface portion of the coupling circuit configuration preferably uses an isolation transformer 310 to couple to the telemetry signal conductors of the wireline or tubing. One terminal of the secondary winding is coupled to ground, while the other terminal is coupled to a transmit signal node 312 via a resistance R. A matching impedance 314 also has one terminal coupled to ground and the other terminal coupled to node 312 via a second, identical resistance R. The downlink signal is provided to node 312 via a low pass filter 316 and a power amplifier 318. The downlink signal voltage on node 312 causes similar currents to flow in the two branches, with a small difference caused by the uplink signal. This uplink signal difference can be detected in the form of a voltage difference between the intermediate nodes of the branches. A differential amplifier 320 amplifies this difference and provides it to a high pass filter 322 for filtering. The discrimination of the high pass filter 322 in filtering out the downlink signal is aided by the common mode rejection of the differential amplifier.

Although a specific coupling circuit configuration has been described, it is recognized that other coupling techniques may be used. Other suitable "4-wire to 2-wire" coupling configurations are known in the art and may be used. Alternatively, the uplink and downlink signals may be carried on separate sets of conductors, or may be transformed into optical signals or pressure signals for other conduit types.

Figure 4:
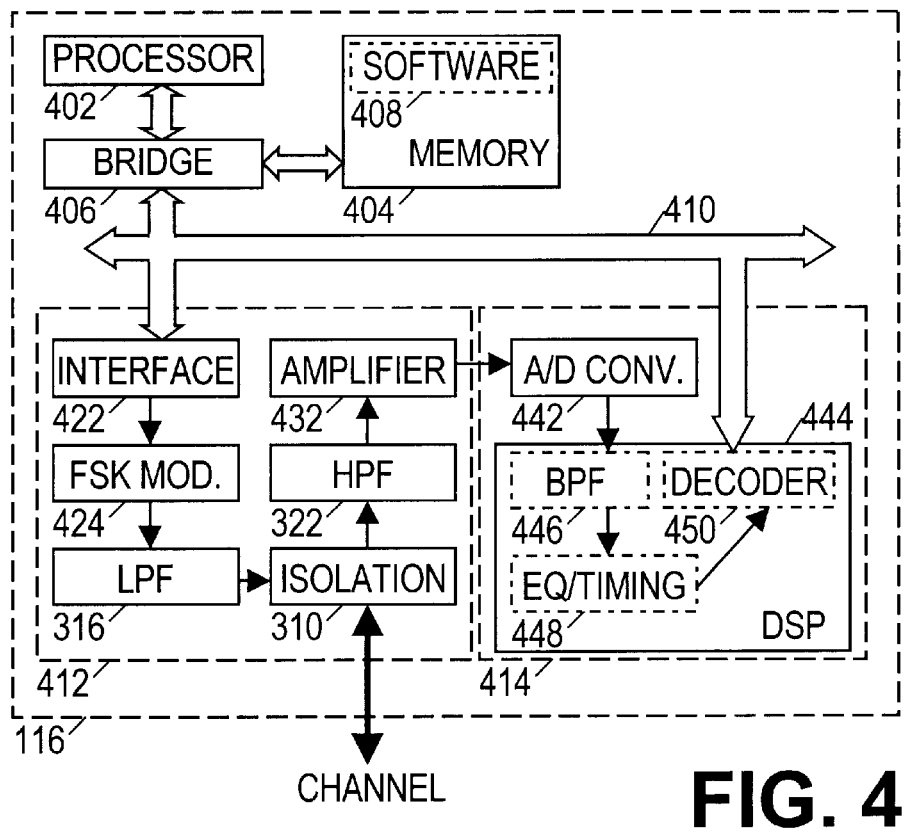
FIG. 4 is a functional block diagram of a surface computer system.

FIG. 4 shows one embodiment of surface computer system 116 (which may be contained in surface facility 920). System 116 includes a central processing unit 402 coupled to a system memory 404 via a bridge 406. System memory 404 stores software 408 for execution by processor 402. Bridge 406 also couples processor 402 to a peripheral bus 410. Peripheral bus 410 supports the transfer of data to and from the processor 402. Peripheral devices connected to peripheral bus 410 can thereby provide the processor 402 with access to the outside world. In the shown embodiment, a signal conditioning board 412 and a digital decoder board 414 are coupled to the peripheral bus 410.

Signal conditioning board 412 is also coupled to the telemetry conduits. Downlink data that the processor 402 wishes to send to the downhole instrument 114 is provided to bus interface logic 422 of the signal conditioning board 412. The interface logic 422 handles compliance with the bus protocol and extracts the downlink data from the bus signals to be provided to frequency-shift key (FSK) modulator 424. FSK modulator 424 converts the data into an analog downlink signal which is then provided to LPF 316 to screen out any high frequency components. Isolation transformer 310 puts the downlink signal onto the telemetry conduits and extracts the uplink signal, passing it to HPF 322 which screens out any low frequency components. The uplink signal is amplified by amplifier 432 and provided to an analog-to-digital converter (ADC) 442 on digital decoder card 414.

ADC 442 preferably provides the digitized signal to a digital signal processor (DSP) 444 for filtering and decoding. DSP 444 is configured by software to perform bandpass or matched filtering 446 and equalization and timing recovery 448 to extract the uplink data symbols. The data symbols are decoded 450 and the decoded uplink data is provided to processor 402 for analysis. Details of the uplink telemetry signal format and decoding will be discussed further below.

Figure 5:
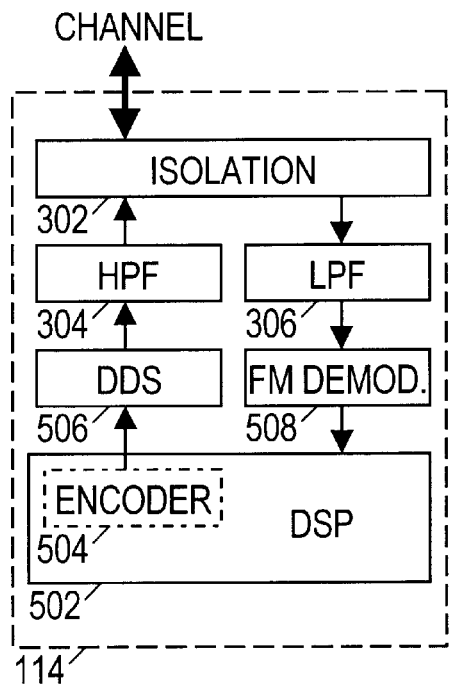
FIG. 5 is a functional block diagram of a downhole communications module in the supervisory sub.

FIG. 5 shows one embodiment of the downhole instrument telemetry module. A DSP 502 is configured by software to format and encode 504 uplink data for transmission to the surface. The encoded digital data is preferably modulated in quadrature amplitude modulation (QAM) form by a direct digital synthesis (DDS) chip 506 to provide an analog uplink signal. The analog uplink signal is high pass filtered 304 and provided to isolation transformer 302. Isolation transformer couples the uplink signal to the telemetry conduits and couples the downlink signal from the telemetry conduits to low pass filter 306. LPF 306 screens out the signal energy above the cutoff frequency, and a demodulator 508 converts the downlink signal into digital baseband form for decoding by DSP 502.

In a preferred embodiment, the downlink signal is a FSK modulated signal using the 2.4–9.6 kHz frequency band. This signal is preferably used to transmit commands and configuration parameters to the downhole instrument. The uplink signal is preferably a burst-QAM modulated signal using the 16–48 kHz frequency band. This signal is preferably used to transmit measurement data to the surface.

The DSP may optionally be a chip from the ADSP-2100 Family of DSP Microcomputers manufactured and sold by Analog Devices, a company doing business in Norwood, Mass. The DDS chip may optionally be an AD7008 CMOS DDS Modulator manufactured and sold by the same company.

Figure 6:
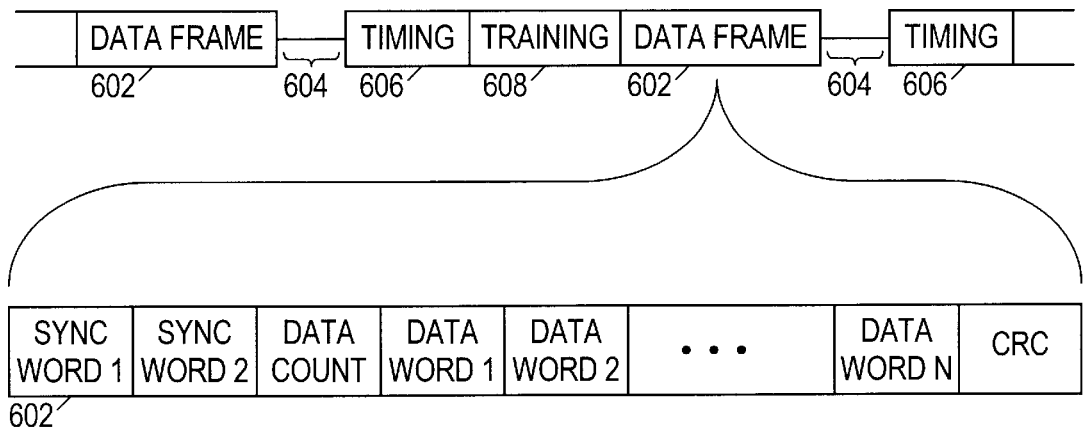
FIG. 6 is an exemplary implementation of an uplink telemetry data frame.

It is noted that the uplink link preferably employs burst-QAM to achieve increased channel capacity without a commensurate increase in receiver complexity. In one embodiment, the burst-QAM communication is done in the form of uplink data frames 602, each frame being preceded by a quiet interval 604 and a timing synchronization sequence 606, as shown in FIG. 6. An equalization training sequence 608 may also be provided immediately before the data frame 602. It is contemplated that the uplink communication be done in terms of 16-bit words, each of which are transmitted as four 4-bit (16-QAM) symbols. The quiet interval 604 is contemplated to be 30 words (120 symbol periods), the timing sequence 606 is contemplated to be 20 words (80 symbols), the training sequence 608 to be 126 words (504 symbols), and the frame 602 to be a maximum of 1024 words (4096 symbols). It is recognized, however, that other configurations may also be suitable. For example, other word lengths may be employed, and the QAM constellation may be made larger (e.g. 32, 64, 128, 256, 512, 1024, or more constellation points), or smaller (i.e. 2, 4, or 8 constellation points).

Data frame 602 preferably begins with two synchronization words, a data count word, up to 1020 words of data, and ends with a checksum word. The data count word preferably indicates the number of data words. The number of data words per frame may be adjusted according to system requirements and according to a desired rate of recurrence of the resynchronization and re-training sequences. For example, if the number of data words per frame is 1020 in the above described embodiment, the timing resynchronization and retraining will occur over 10 times per second. However, in some conditions it may be desired to increase the resynchronization frequency to over 20 times per second. This may be achieved by reducing the number of data words per frame to about 512. Alternatively, the number of bits per QAM symbol may be increased to reduce the number of symbols per frame.

Figure 7:
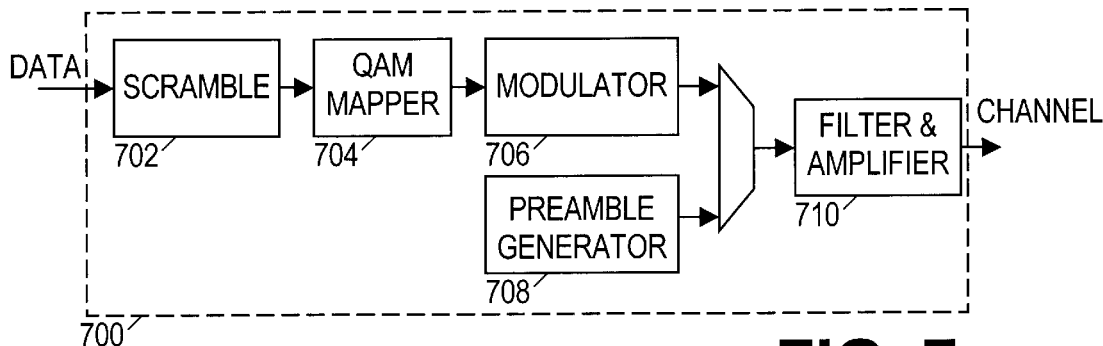
FIG. 7 is a functional block diagram of an uplink telemetry transmitter.

FIG. 7 shows, in functional block form, the uplink signal transmit path 700. In block 702 the data frame 602 is "scrambled" by bit-by-bit XOR-ing it with a pseudorandom sequence. The pseudorandom sequence is an easily reproduced mask which "randomizes" the data frame to remove predictable, periodic patterns that often occur in measurement data. Such patterns, if not removed, may cause undesirable spectral lines that interfere with adaptive equalization in the receiver.

The scrambled data is then, in block 704, divided into symbols that are mapped to signal points in the QAM constellation. In block 706, the symbols are modulated onto a carrier frequency, filtered and amplified in block 710, and coupled to the telemetry conduits. A preamble generator block 708 is shown parallel to the data path. Preamble generator 708 generates the quiet period 604, timing synchronization sequence 606, and training sequence 608, and inserts them into the transmit signal ahead of each data frame. Referring momentarily to FIG. 5, blocks 702 and 704 may be part of encoder software 504, blocks 706 and 708 may be implemented by the DDS chip 506, and block 710 may be implemented by HPF 304.

Figure 8:
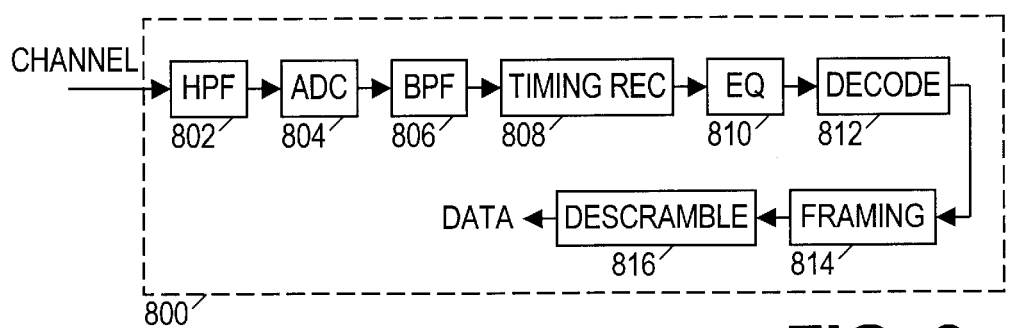
FIG. 8 is a functional block diagram of an uplink telemetry receiver.

FIG. 8 shows, in functional block form, the uplink signal receive path 800. In block 802, the signal received from the telemetry conduits is filtered to screen out signal energy below the uplink signal cutoff frequency. The uplink signal is then digitized in block 804, and match-filtered in block 806 to maximize the signal-to-noise ratio. In block 808, a timing recovery algorithm operates to lock the receiver timing to the timing synchronization sequence. In block 810, the uplink signal is equalized to correct for channel effects. During the equalization of the training sequence, knowledge of the training sequence is used to adapt the equalizer to the telemetry channel. The equalizer consequently exhibits improved equalization performance on the data frame. The equalizer output is a sequence of QAM symbols. In block 812, the symbol sequence is converted to a 16-bit word sequence, with proper alignment achieved from knowledge of the training sequence. Block 814 blocks the extraneous words from the quiet interval, the timing sequence, and the training sequence, and passes on only the data frame. In block 816, the scrambling operation is reversed, the check sum verified, and the data count, along with the data words, provided as output. Referring momentarily to FIG. 4, block 802 corresponds to block 322, block 804 to block 442, block 806 to block 446, blocks 808 and 810 to block 448, and blocks 812–816 to block 450.

The exemplary embodiments described above provide for telemetry through conduits in wireline and composite tubing. In the case of electrical conductors in composite tubing, the telemetry channel is expected to have a range of up to 50,000 ft with an attenuation of 40–45 dB in the frequency ranges under consideration. The framing structure employed in burst-QAM signaling is expected to provide regularly recurring opportunities for timing resynchronization and equalizer retraining. This is expected to significantly improve the reliability of the uplink channel.

It is noted that the telemetry system disclosed herein may have multiple applications, including, for example, smart wells. Smart wells are production wells that may have sensors and controllable mechanisms downhole. The sensors may, for example, be used to detect density and flow rates. An uphole system may use this information to operate the controllable mechanisms (e.g. variable aperture ports and heaters or other artificial lift mechanisms) to optimize the production of the well.

Numerous variations and modifications will become apparent to those skilled in the art once the above disclosure is fully appreciated. It is intended that the following claims be interpreted to embrace all such variations and modifications.

What is claimed is:

1. A well comprising:

a wireline cable having a telemetry conduit;

a surface system coupled to the telemetry conduit; and a downhole instrument coupled to the surface system via the telemetry conduit, wherein the downhole instrument is configured to transmit telemetry information to the surface system using burst quadrature amplitude modulation (burst-QAM).

2. The well of claim 1, wherein the burst-QAM uses a signal constellation of 16 points.

3. The well of claim 1, wherein the wireline cable includes multiple electrical conductors, of which one or more serve as the telemetry conduit.

4. The well of claim 1, wherein the downhole instrument is configured to transmit the telemetry information in data frames, and wherein the data frames are interspersed with quiet periods.

5. The well of claim 1, wherein the downhole instrument is configured to transmit the telemetry information in data frames, and wherein each data frame is preceded by a respective timing synchronization sequence.

6. The well of claim 1, wherein the downhole instrument is configured to transmit the telemetry information in data frames, and wherein each data frame is preceded by a respective training sequence.

7. The well of claim 4, wherein each data frame consists of a plurality of synchronization words, a data count field, a plurality of data words, and a check word.

8. The well of claim 1, wherein the downhole instrument includes a transmit path having a preamble generator configured to transmit a preamble before each data frame.

9. The well of claim 8, wherein the transmit path includes a data scrambler configured to combine data frame data words with a mask to randomize the data words.

10. The well of claim 9, wherein the transmit path includes a direct digital synthesis modulator configured to modulate the scrambled data words using quadrature amplitude modulation.

11. The well of claim 10, wherein the transmit path includes a high pass filter coupled between the direct digital synthesis modulator and an isolation transformer.

12. The well of claim 9, wherein the surface system includes an uplink receive path having:

a timing recovery module configured to generate a clock signal locked to a timing synchronization sequence preceding each data frame in the telemetry signal;

an adaptive equalizer configured to update filter coefficients in response to a training sequence preceding each data frame in the telemetry signal;

a framing module configured to strip the timing synchronization sequences and the training sequences from the telemetry signal; and a descrambling module configured to combine the data frames with the mask to reverse a downhole scrambling operation.

13. The well of claim 12, wherein the timing synchronization sequences and training sequences are repeated at least 10 times per second.

14. A well comprising:

a tubing string that extends into a well bore;

a downhole instrument mounted on a lower end of the tubing string; and a wireline cable that extends along the tubing string through an interior space, wherein the downhole instrument is configured to transmit telemetry information to an upper end of the tubing string via telemetry conduits in the wireline, using burst quadrature amplitude modulation (burst-QAM).

15. The well of claim 14, wherein the wireline cable includes multiple electrical conductors, of which one or more serve as the telemetry conduit.

16. The well of claim 14, wherein the downhole instrument is configured to transmit the telemetry information in data frames, and wherein the data frames are interspersed with quiet periods.

17. The well of claim 14, wherein the downhole instrument is configured to transmit the telemetry information in data frames, and wherein each data frame is preceded by a respective timing synchronization sequence.

18. The well of claim 14, wherein the downhole instrument is configured to transmit the telemetry information in data frames, and wherein each data frame is preceded by a respective training sequence.

19. The well of claim 16, wherein each data frame consists of a plurality of synchronization words, a data count field, a plurality of data words, and a check word.

* * * * *